United States Patent
Kamath et al.

(10) Patent No.: US 6,879,729 B2
(45) Date of Patent: Apr. 12, 2005

(54) PARALLEL OBJECT-ORIENTED, DENOISING SYSTEM USING WAVELET MULTIRESOLUTION ANALYSIS

(75) Inventors: Chandrika Kamath, Dublin, CA (US); Chuck H. Baldwin, Dublin, CA (US); Imola K. Fodor, Oakland, CA (US); Nu A. Tang, Sacramento, CA (US)

(73) Assignee: The Regents of the University of California, Oakland, OH (US)

( * ) Notice: Subject to any disclaimer, the term of this patent is extended or adjusted under 35 U.S.C. 154(b) by 654 days.

(21) Appl. No.: 09/877,962

(22) Filed: Jun. 8, 2001

(65) Prior Publication Data

US 2003/0026493 A1 Feb. 6, 2003

(51) Int. Cl.⁷ .............................. G06K 9/40; G06K 9/54; G06K 9/60
(52) U.S. Cl. ....................... 382/254; 382/304; 382/260; 382/275
(58) Field of Search ................................. 382/240, 248, 382/250, 304, 254, 260, 275

(56) References Cited

U.S. PATENT DOCUMENTS

| | | | |
|---|---|---|---|
| 5,692,107 A | 11/1997 | Simoudis et al. | 395/50 |
| 5,758,147 A | 5/1998 | Chen et al. | 395/606 |
| 5,787,425 A | 7/1998 | Bigus | 707/6 |
| 6,049,861 A | 4/2000 | Bird et al. | 712/28 |
| 6,124,866 A * | 9/2000 | Asano et al. | 345/505 |

OTHER PUBLICATIONS

S. K. Murthy, et al., "A System for Induction of Oblique Decision Trees," 1994, Journal of Artificial Intelligence Research 2 (1994), pp. 1–32.

S. G. Chang, et al., "Adaptive Wavelet Thresholding for Image Denoising and Compression," Oct. 1997, IEEE Transactions on Image Processing, pp. 1–35.

A. Bruce, et al., "Applied Wavelet Analysis with S–PLUS," 1996, http://www.springer_ny.com/catalog/npljul96np/DATA/0-387-94714-0.html, 1 page.

K. Alsabti, et al., "CLOUDS; A Decision Tree Classifier for Large Datasets," Oct. 27, 1998, pp. 1–34.

C. Kamath, et al., "On the design and implementation of a parallel, object–oriented, image processing toolkit," Center for Applied Scientific Computing, Lawrence Livermore National Laboratory, 2000, 13 pages.

P.B. Duffy, et al., "Effect of Missing Data on Estimates of Near–Surface Temperature Change Since 1900," 2000, UCRL–JC–140272–ABS, 2 pages.

R. Todd Ogden, "Essential Wavelets for Statistical Applications and Data Analysis," 1997, Birkhauser, 16 pages.

D. Donoho, et al., "Ideal Spatial Adaptation by Wavelet Shrinkage," 1994, Biometrika (1994), 81, 3. pp. 425–455.

(Continued)

Primary Examiner—Amelia M. Au
Assistant Examiner—Wesley Tucker
(74) Attorney, Agent, or Firm—Eddie E. Scott; Alan H. Thompson (57) ABSTRACT

The present invention provides a data de-noising system utilizing processors and wavelet denoising techniques. Data is read and displayed in different formats. The data is partitioned into regions and the regions are distributed onto the processors. Communication requirements are determined among the processors according to the wavelet denoising technique and the partitioning of the data. The data is transforming onto different multiresolution levels with the wavelet transform according to the wavelet denoising technique, the communication requirements, and the transformed data containing wavelet coefficients. The denoised data is then transformed into its original reading and displaying data format.

4 Claims, 6 Drawing Sheets

OTHER PUBLICATIONS

R. Kohavi, et al., "MLC++: A Machine Learning Library in C++," 1994, Appears in Tools with AI'94, 4 pages.

Imola K. Fodor, et al., "On denoising images using wavelet-based statistical techniques," 2001, IEEE Transactions in Image Provessing vol. XX, No. Y, 2001, draft, pp. 100–125.

C. Kamath, et al, "On the design and implementation of a parallel, object–oriented, image processing toolkit," Jul. 2000, Parallel and Distributed Methods for Image Processing IV, 12 pages.

C. Kamath, et al., "On the Design of a Parallel Object–Oriented Data Mining Toolkit," 2000, Workshop on Distributed and Parallel Knowledge Discovery, Boston, MA Aug., 20, 2000, 16 pages.

M. Joshi, "ScalParC: A New Scalable and Efficient Parallel Classification Algorithm for Mining Large Datasets," Apr. 1998, 20 pages.

E. Cantu–Paz, et al., "Using Evolutionary Algorithms to Induce Oblique Decision Trees," 2000, Center for Applied Scientific Computing, Lawrence Livermore National Laboratory, 11 pages.

D. Donoho, et al., "Wavelab 802 for Matlab5.x," http://www–stat.standord.edu/~wavelab, Oct. 3, 1999, 3 pages.

A. Bruce, et al., "WaveShrink: Shrinkage Functions and Thresholds," StatSci Division, MathSoft, Inc., 1995, 12 pages.

F. Ruggeri, et al., "A Bayesian Decision Theoretic Approach to Wavelet Thresholding," CNR–IAMI and Duke University, preprint 1995 (published date 1998), 17 pages.

* cited by examiner

PARALLEL OBJECT-ORIENTED, DENOISING SYSTEM USING WAVELET MULTIRESOLUTION ANALYSIS

CROSS REFERENCE TO RELATED APPLICATIONS

Related subject matter is disclosed and claimed in the following commonly owned, copending, U.S. patent applications, "PARALLEL OBJECT-ORIENTED DATA MINING SYSTEM," by Chandrika Kamath and Erick Cantu-Paz, patent application Ser. No. 09/877,685, filed Jun. 8, 2001, and "PARALLEL OBJECT-ORIENTED DECISION TREE SYSTEM," by Chandrika Kamath and Erick Cantu-Paz, patent application Ser. No. 09/877,570, filed Jun. 8, 2001, which are hereby incorporated by reference in their entirety.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to data denoising and more particularly to parallel object-oriented data denoising.

2. State of Technology

U.S. Pat. No. 5,787,425 for an object-oriented data mining framework mechanism by Joseph Phillip Bigus, patented Jul. 28, 1998 provides the following description, "The development of the EDVAC computer system of 1948 is often cited as the beginning of the computer era. Since that time, computer systems have evolved into extremely sophisticated devices, capable of storing and processing vast amounts of data. As the amount of data stored on computer systems has increased, the ability to interpret and understand the information implicit in that data has diminished. In the past, data was stored in flat files, then hierarchical and network data based systems, and now in relational or object oriented databases. The primary method for analyzing that data has been to form well structured queries, for example using SQL (Structured Query Language), and then to perform simple aggregations or hypothesis testing against that data. Recently, a new technique called data mining has been developed, which allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information. Because data can be stored in such a wide variety of formats and because the data values can have such a wide variety of meanings, data mining applications have in the past been written to perform specific data mining operations, and there has been little or no reuse of code between application programs. Thus, each data mining application is written from scratch, making the development process long and expensive. Although the nuggets of business information that a data mining application discovers can be quite valuable, they are of little use if they are expensive and untimely discovered. Returning to the mining analogy, even if gold is selling for $900 per ounce, nobody is interested in operating a gold mine if it takes two years and $901 per ounce to get it out of the ground."

The journal article, "On Denoising Images Using Wavelet-based Statistical Techniques," by Fodor, I. K. and C. Kamath, submitted to IEEE Transactions on Image Processing, March 2001 provides information about the state of the technology of denoising images. With sensors becoming ubiquitous and computers becoming more powerful, scientists are collecting and analyzing data at an ever increasing pace. This has resulted in several interesting problems in the analysis of data from areas as diverse as astronomy, medical imaging, and computer vision. In these fields, the data that is collected by sensors is often noisy, either as a result of the data acquisition process or due to natural phenomena such as atmospheric disturbances. Therefore, removing the noise from the data is an important problem that must be addressed before Applicants can analyze the data.

One approach to denoising data involves the thresholding of wavelet coefficients. Most methods in the literature have been designed for one-dimensional signals, but they can be extended to higher dimensional signals as well.

Various wavelet denoising techniques on two-dimensional data are compared and contrasted. Large-scale scientific data mining involves the analysis of massive datasets arising in scientific applications. As these data are frequently noisy, with the noise statistics varying from domain to domain, and sometimes from image to image, a software system was developed to enable experimentation with different options in wavelet denoising. The goal was three-fold. The first was to create a comprehensive object-oriented software library of wavelet denoising techniques to complement the extensive literature and existing software on the subject. While there are some packages such as WAVELAB that include denoising using wavelets, none provide a complete implementation of all the techniques proposed in the literature. Second, Applicants wanted to provide scientists, who are not experts in wavelet denoising, with a choice of techniques, so that they could select a combination appropriate for their data. Third, Applicants wanted to compare and contrast the various options in order to provide guidance and recommendations on their usage.

A section provides a brief introduction to denoising by thresholding of wavelet coefficients. Applicants explain the various options in denoising such as the choice of wavelet transforms, noise estimation techniques, threshold calculation methods, and threshold application schemes. A section contains a comprehensive evaluation of the various denoising combinations. Applicants compare the performance of the methods on test images with simulated noise and evaluate them with respect to the known noiseless images. Another Section compares the wavelet-based techniques to more traditional approaches to denoising based on spatial filters. The journal article, "On Denoising Images Using Wavelet-based Statistical Techniques," by Fodor, I. K. and C. Kamath, submitted to IEEE Transactions on Image Processing, March 2001 is incorporated herein by this reference.

SUMMARY OF THE INVENTION

The present invention provides a data de-noising system utilizing processors and wavelet denoising techniques. Data is read and displayed in different formats. The data is partitioned into regions and the regions are distributing onto the processors. Communication requirements are determined among the processors according to the wavelet denoising technique and the partitioning of the data. The data is transformed onto different multiresolution levels with the wavelet transform according to the wavelet denoising technique, the communication requirements, and the transformed data containing wavelet coefficients. The wavelet coefficients are thresholded to obtain the denoised data. The denoised data is then transformed into its original reading and displaying data format.

An embodiment of the present invention was tested in connection with the Faint Images of the Radio Sky at Twenty-cm (FIRST) survey. Radio sources exhibit a wide range of morphological types. Of particular interest are sources with a bent-double morphology, as they indicate the presence of large clusters of galaxies. FIRST scientists had been attempting to identify bent-doubles by manually looking through the images. The image dataset is "only" about 200 Gigabytes, moderate by today's emerging standards, but large enough to inhibit an exhaustive visual inspection by the astronomers. The FIRST survey has been producing the radio equivalent of the Palomar Observatory Sky Survey. Using the Very Large Array (VLA) at the National Radio Astronomy Observatory (NRAO), FIRST was scheduled to cover more than 10,000 square degrees of the northern and southern galactic caps, to a flux density limit of 1.0 mJy (milli-Jansky). At present, with the data from the 1993 through 1998 observations, FIRST has covered about 6,000 square degrees, producing more than 32,000 image maps. Each image map is 1550 by 1150 pixels, large enough to benefit from parallel processing. Due to the sensors used to collect the data, there is a pronounced noise pattern that appears as "streaks" in the image. The task of denoising these images is made challenging by the fact that some of the information necessary to identify a galaxy as a bent-double, could lie on a "streak" and be removed as "noise."

To ensure that wavelet denoising can indeed be applied to Applicants images without any significant loss of useful information, Applicants first experimented with the serial version of Applicants code on a small image extracted from the larger image map. All the examples were obtained using the Haar wavelet, and three multiresolution levels in the wavelet decomposition. Applicants conducted experiments with other wavelets and denoising options to find an optimal combination for the FIRST dataset. A good technique removes the background noise effectively, but keeps the important bent-double features intact. For example, in the bent-double, the two wavy lobes of the bent-double are connected by a fainter bridge. This bridge is important as it can be used to calculate the "angle" of the galaxy to determine if it is a bent-double or not. As the bridge lies on one of the noise streaks, Applicants have to be careful in the use of denoising. This task is made more challenging by the fact that the number of radio galaxies precludes individual examination of the effects of denoising on each image.

The present invention has many uses. It provides a data de-noising system for scientific, engineering, business and other data. The system has applications which include, but are not limited to the following: astrophysics, detecting credit card fraud, assuring the safety and reliability of the nation's nuclear weapons, nonproliferation and arms control, climate modeling, the human genome effort, computer network intrusions, reveal consumer buying patterns, recognize faces, recognize eyes, recognize fingerprints, analyze optical characters, analyze the makeup of the universe, analyze atomic interactions, astronomy, medical imaging, and computer vision, and analyzing data gathered from simulations, experiments, or observations. Embodiments of the present invention provide scientific researchers with tools for use in plowing through enormous data sets to turn up information that will help them better understand the world around us and assist them in performing a variety of scientific endeavors. Other embodiments of the present invention provide academic and business users with tools for use in plowing through enormous data sets to turn up information that will help them produce useful information.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Referring now to the drawings, to the following detailed information, and to incorporated materials; a detailed description of the invention, including specific embodiments, are described. The description of the specific embodiments, together with the general description of the invention, serve to explain the principles of the invention. The scope of the invention is not intended to be limited to the particular forms disclosed and the invention covers all modifications, equivalents, and alternatives falling within the spirit and scope of the invention as defined by the claims.

In diverse fields from planetary science to molecular spectroscopy, scientists, computer specialists, and others are faced with the problem of recovering a true signal from incomplete, indirect or noisy data. Scientific data, especially data from observations and experiments, is noisy. This noise may vary within an image, from image to image, and from sensor to sensor. Removing the noise from data, without affecting the signal is a challenging problem in scientific data sets.

Advances in technology have enabled the collection of data from observations, experiments, and simulations at an ever increasing pace. As these data sets approach the terabyte and petabyte range, scientists, computer experts, and others are increasingly using semi-automated techniques from data mining and pattern recognition to find useful information in the data. In order for data mining to be successful, the raw data must first be processed into a form suitable for the detection of patterns. When the data is in the form of images, this can involve a substantial amount of processing on very large data sets.

Applicants have designed, developed, and tested an embodiment of the present invention wherein an object-oriented image processing system specifically targets massively-parallel, distributed-memory architectures. Applicants show that it is possible to use object-oriented technology to effectively address the diverse needs of image applications. In addition, Applicants show how similarities in image processing algorithms can be used to enable re-use in Applicants software. Applicants also show the difficulties encountered in parallelizing image algorithms on massively parallel machines as well as the bottlenecks to high performance. Applicants have demonstrated the system using images from an astronomical data set, and have illustrated how techniques such as filters and denoising through the thresholding of wavelet coefficients can be applied when a large image is distributed across several processors.

The present invention provides a data denoising system. The system has applications which include, but are not limited to, astrophysics, detecting credit card fraud, assuring the safety and reliability of the nation's nuclear weapons, nonproliferation and arms control, climate modeling, the human genome effort, computer network intrusions, revealing consumer buying patterns, recognizing faces, recognizing eyes, recognizing fingerprints, astronomy, medical imaging, computer vision, analyzing optical characters, analyzing the makeup of the universe, analyzing atomic interactions, and analyzing data gathered from simulations, experiments, or observations.

Embodiments of the present invention provide scientific researchers with tools for use in plowing through enormous data sets to turn up information that will help them better understand the world around us and assist them in performing a variety of scientific endeavors. Other embodiments of the present invention provides academic and business users with tools for use in plowing through enormous data sets to turn up information that will help them performing a variety of endeavors.

Image processing plays an important role in the analysis of images using data mining and pattern recognition techniques. Image data is usually available in it's raw form as pixel values. However, the object or pattern of interest is often at a higher level such as a galaxy, a road, or a face. As a result, higher level features that are representative of the pattern must first be extracted from the image, prior to pattern recognition. This task can be very intensive when the images are large, either in size, or in number, or both. In such cases, parallel processing can play an important role in reducing the turnaround time.

Applicants demonstrate how object-oriented techniques can be used, in conjunction with parallel processing, to design and implement an efficient system for image processing tasks. Applicants first describe the process of data mining for extracting useful information from data. Applicants identify several image processing tasks that can help in feature extraction. Applicants illustrate how object-oriented techniques can be used to abstract out commonalities in different image processing tasks. Applicants discuss the approach taken to implement some of these tasks in parallel. Applicants describe on-going efforts in the project to re-use the code, both in the computation and communication parts of the software. The task of denoising image data by thresholding wavelet coefficients is described. Applicants describe work in denoising an astronomical data set.

ROLE OF IMAGE PROCESSING IN DATA MINING—Data mining is a process concerned with uncovering patterns, associations, anomalies, and statistically significant structures in data. It is an iterative and interactive process involving data preparation, search for patterns, knowledge evaluation, and refinement of the process based on input from domain experts. In the data preparation stage, Applicants extract features from the raw data that are representative of the data and relevant to the problem being solved. This step can consist of several stages such as the use of sampling or multi-resolution to reduce the size of the data, denoising of the data, feature extraction, and dimension reduction to reduce the number of features (or dimension) of the problem. This critical first step can frequently take up to 90% of the total time for data mining in moderate-sized data sets.

The application of data mining to image data typically involves the use of image processing techniques in the data preparation step. The intensive nature of these tasks, especially when the data set is very large, makes these tasks ideal for parallel processing. If the data set consists of a large number of small to moderate size images, an understood use of parallel processors would be to assign one or more images to each processor. However, if each image is itself very large, an individual may want to use parallel processing within an image. To do this efficiently can be very challenging.

Image processing techniques that are commonly used in mining image data include image registration, enhancement, denoising, segmentation, edge detection, feature extraction and multi-resolution analysis. Applicants illustrate an approach to parallel implementation using wavelets and wavelet denoising. These are appropriate operations to consider as they are composed of other operations that occur in several image processing tasks. For example, Applicants consider wavelets and multi-resolution analysis in terms of filters banks composed of high- and low-pass filters. Efficient implementation of filters in the context of wavelets will therefore help several other operations such as edge detection and smoothing. In addition, certain ideas developed in the context of filters, can also be applied in other areas such as morphological image processing.

Applicants describe how object-oriented techniques can help to abstract out the commonalties in image processing operations. Through the use of object-oriented design and programming, several different input data formats can be supported in a user-friendly interface. In addition, for the parallel implementation of algorithms, the parallel processing tasks that are common across several operations can be identified and isolated. The resulting software re-use enables enhancement of the functionality of the software.

BENEFITS OF OBJECT-ORIENTED DESIGN AND PROGRAMMING—In the last decade, there has been an increasing interest in using object-oriented paradigms for the development of software in scientific applications. This approach is attractive as it supports well-defined mechanisms for a modular design, re-use of code, data abstractions, and the creation of flexible software that can easily be enhanced to support new applications as well as solution techniques. While object-oriented applications may initially be more abstract, difficult to understand and implement, and possibly slower, they do provide the means of addressing complex problems through step-wise software development. Applicants illustrate this through a simple example.

The data that is input to an image processing application can vary in the format used for storing the data. Often, several different formats are supported even within a single application domain such as astrophysics. Sometimes, even a single data format can support multiple options. For example, the FITS format used in astronomy can store one-, two-, or three-dimensional, real or integer data. Given the numerous formats currently in use in the image processing community, it is impractical and cumbersome to provide support for all of them. A simple solution to this problem is to first convert the input format into a standard format and then operate only on the standard format.

Figure 1:
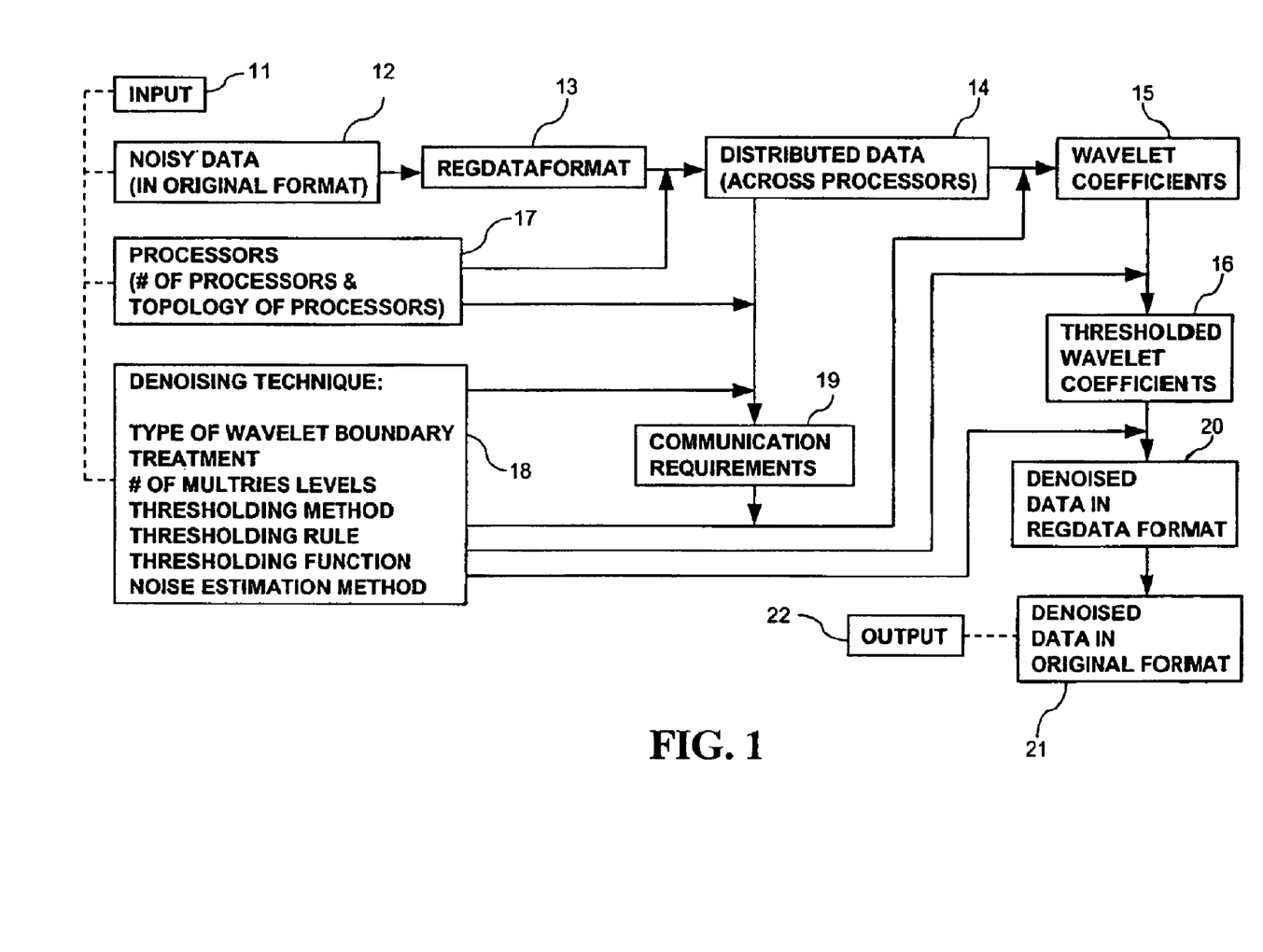
FIG. 1 is a flowchart illustrating the class hierarchy used for implementing an embodiment of the present invention.

FIG. 1 is a flow chart, generally designated by the reference numeral 10, that illustrates the class hierarchy used by Applicants. Input information from INPUT 11 is provided to the entities Noisy Data 12, Processors 17, and Denoising Technique 18. The Noisy Data 12 is transformed into RegData Format 13. The RegData is distributed among processors. The communications requirements are determined.

The data is transformed onto different multiresolution levels with the wavelet transform according to the wavelet denoising technique, the communication requirements, and the transformed data containing wavelet coefficients. The wavelet coeff. are thresholded=denoised data. The denoised data, Denoised Data in RegData Format 20, is then transformed into its original reading and displaying data format, Denoised Data in Original Format 21, to provide Output 22.

All the domain specific data formats, such as FITSData and HDFData are derived from a base class, DomainData. The base class provides the interface for common operations such as reading and writing an input data file. Each of the derived classes implements the operation based on the specifics of the data format. As a result, much of the detail of a data format is hidden from the user, providing a friendlier interface. The RegData class is Applicants internal standard data format for one-, two-, and three-dimensional data. It is templated on the type of data—floats, doubles, or integers. The template mechanism allows easy support operations for the case where the identical code is executed on different data types. It also allows easily added data types as the need for them arises, without having to create a new version of the code for the new data type.

There are other areas where an individual can benefit by abstracting out the commonalties in image processing operations. For example, many techniques in image processing can be expressed as operations among local collections of pixels (or geometric regions). Linear filters and discrete wavelet operators, where a linear transformation is applied to neighboring pixels in the specified region, are examples of such techniques. Other examples where the transformation depends on the local data are non-linear filters and morphological operators. Applicants distinguish between transformations that have associated values and those which do not. The former are defined by the Stencil class and the latter by the Neighborhood class. The geometric regions associated with both are formulated by the user as index offsets from an implied origin. An object in each class is configured with these offsets. In the case of a Stencil class, there are also associated values that are templated on the data type. The operator can be used in filtering, wavelet operators, or any other operation where the values can be a-priori associated with specific pixels in a region. This is used in non-linear filtering, morphological operators, and other contexts where the user is unable to associate values with specific pixels in a region—either because values do not exist or they vary in space or time, and therefore cannot be hard coded into the object.

Figure 2:
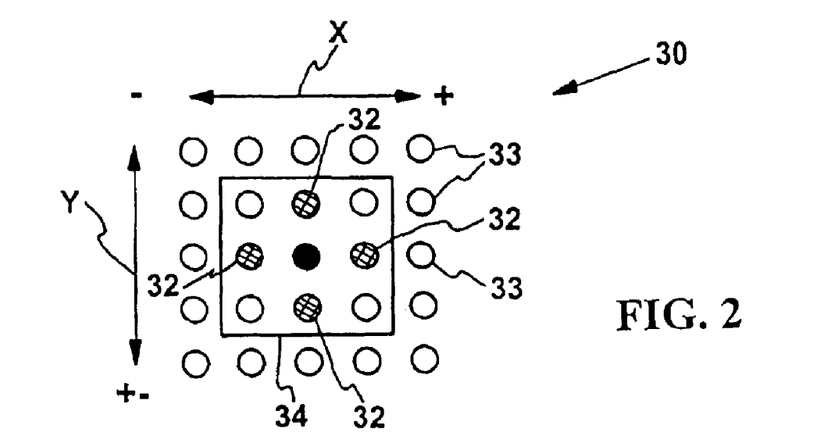
FIG. 2 is an example of a simple "3 by 3 Neighborhood" used in an embodiment of the present invention.

FIG. 2 is an example of a simple 3 by 3 Neighborhood, generally designated by the reference numeral 30. In this example, the implied origin is the black circle "●" designated by the reference numeral 31. It, along with the gray circles 32, represents the specific collection of pixels 33 that is the geometric region of the Neighborhood. Note that the origin is part of the Neighborhood. The outline it (bounding box 34) represents the maximum extents of the collection of pixels that form the Neighborhood. The region is "encoded" in the example Neighborhood object by the following collection of (x,y) offsets:

{(0,−1),(−1,0),(0,0),(1,0),(0,1)}.

Applicants' object-oriented software is designed so that both the Neighborhood and the Stencil classes are inherited from a base class. The interface of this class provides generic operations on either of the derived classes—several of these operations are used in inter-process communication and boundary treatments. For example, one of the virtual member functions in the abstract base class is the it get Bounding Box function. This function returns an abstract object, containing the extents of the bounding box described above. It gives a gross specification of the geometric region which forms the stencil/neighborhood. More details on how this can be used in inter-process communications are given in the next section.

PARALLEL IMPLEMENTATION—Applicants image processing system is targeted toward Massively Parallel Processors (MPPs) or clusters of Symmetric Multi-Processors (SMPs). On these architectures, communication between processors is done through the use of the Message Passing Interface (MPI) and the OpenMP libraries. Several important issues have to be considered in order to design and implement an efficient parallel image processing system. Many of these can be characterized as cost related.

Minimizing the cost of communication is critical to parallel performance and scalability of any software. In the MPI programming paradigm, data is communicated between processors as conceptual "sends" and "receives."

The implementation of this send/receive mechanism is architecture dependent; but, as a rule, it is more expensive to carry out communication of arithmetic data than computation with the same data. Another important issue is to minimize the time spent in first developing, and later, debugging, parallel algorithms. In light of these issues, Applicants design approach seeks to:

Perform the communication efficiently in order to minimize its effect.

Reduce the development and maintenance time through the re-use of common communication-related elements.

To achieve these goals and incorporate flexibility into Applicants software, it is desirable that the image processing operations be independent of the data distribution and communication paradigms. In other words, Applicants want Applicants algorithms to work regardless of how the user has configured the processors. To accomplish this, Applicants need to incorporate the following into Applicants design methodology:

Develop data partitions and processor configurations

Determine the communication requirements based on the partition

Efficiently agglomerate the work

Map the work to the processors

Perform the actual work

For the stencil- and neighborhood-based operations mentioned in the previous section, many of the ideas for effectively implementing the above methodology have been studied extensively. In particular, Applicants can benefit from the work done in the fields of parallel numerical techniques for Linear Algebra and the solution of Partial Differential Equations. Applicants exploit the fact that in general, the stencil/neighborhood operations have the following characteristics:

Local—each task communicates with a small set of other tasks

Structured—a task and its neighbors form a regular structure

Static—the identity of communication partners does not change over time

Synchronous—producers and consumers execute in a coordinated fashion, with producer/consumer pairs cooperating in data transfer operations An effective way to address such problems is to first partition the image into contiguous rectilinear collections of pixels called boxes, and then to configure the processors to the resulting rectilinear partitioning. A box specifies the lower and upper indices that denote the corners of a sub-image. The idea stems from an abstract "index space"' associated with the original image. Note that the box object itself is small—it contains no actual data but only the indices representing the lower and upper corners which the sub-image occupies in the index space. It is included with the actual pixel data in a higher level object that represents the sub-image. As an example, consider a 2 dimensional M by N image. An abstract box associated with a sub-image $\{(i_0,j_0),(i_1,j_1)\}$ consists of indices (i,j):

$$(i,j): 0 \leq i_0 S_i \leq i_1 < M, 0 \leq j_0 \leq j \leq j_1 < N.$$

Figure 3:
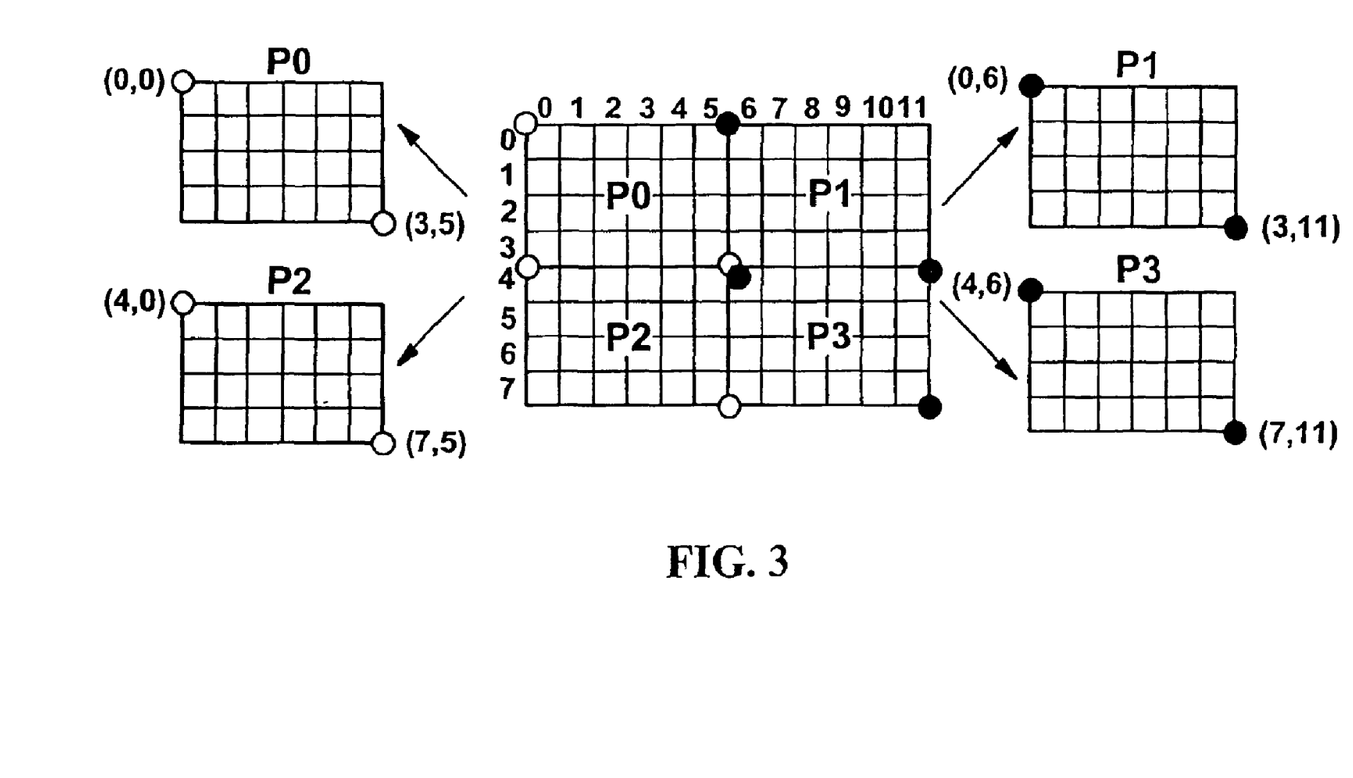
FIG. 3 depicts an 8 by 12 "image" decomposed onto a 2×2 processor configuration with processors $P_0$ through $P_3$ used in an embodiment of the present invention.

FIG. 3 depicts an 8 by 12 "image" decomposed onto a 2×2 processor configuration with processors $P_0$ through $P_3$. If the image indices are from the region of index space $\{(0, 0), (7, 11)\}$, then the four boxes associated with each sub-image and processor assignment are:

$P_0: \{(0,0),(3,5)\}$, $P_1: \{(0,6),(3,11)\}$, $P_2: \{(4,0),(7,5)\}$, $P_3: \{(4,6),(7,11)\}$.

To accommodate this functionality, Applicants have included classes for "boxes" ' in Applicants system. These classes include functions that perform set or algebraic operations on boxes, often called box calculus. Some of these operations include:

Grow/shrink—increase (or decrease) the size of a box in various ways,

Refine/coarsen—refine (or coarsen) the index space associated with the box, and

Intersect/union—perform set manipulations with the index spaces.

This box concept, along with the conventions adopted in MPI, enables us to address, directly or indirectly, the design methodology concepts mentioned earlier. An image processing application first uses MPI to create logically rectangular processor configurations and then maps the data onto the processor configuration in the form of boxes. To address performance concerns, Applicants system includes data distribution algorithms that partition the data and configure the processors so that the surface to volume ratio of the boxes is minimized. For operations based on regular grids, such as images, this minimization of the surface to volume ratio tends to minimize the cost of communication and maximize the performance.

The stencil/neighborhood concept introduced earlier can be used to "package" general communication procedures within the system. Since a stencil/neighborhood object contains information on the indices needed for local computations, the "gross" data requirements can be given for any such calculation in the form of a bounding box of the stencil/neighborhood operator. For instance, the 3 by 3 Neighborhood in FIG. 2, has its bounding box described using the abstract box $\{(-1,-1), (1,1)\}$. The application of many linear and non-linear filters can use the stencil/neighborhood concept in order to create re-usable code. For example, if Applicants ignore boundary treatment, a simple linear operation which averages the values of $a_{i,j}$ in a 3×3 area around a specific index (i,j) can be written as:

$$b_{i,j} = \sum_{n=-1}^{n=1} \sum_{m=-1}^{m=1} \frac{1}{9} a_{i+m,j+n},$$

The same result can be achieved by creating a Stencil as the following nine index/value pairs:

---

$\{(-1, -1); 1/9\}, \{(0, -1); 1/9)\}, \{(1, -1; 1/9\},$
$\{(-1, 0) 1/9\}, \{(0, 0); 1/0\}, \{(1, 0; 1/9\},$
$\{(-1, 1) 1/9\}, \{(0, 1); 1/9\}, \{(1, 1; 1/9\},$

--- and using the following algorithm to "apply" the stencil to an image:

Algorithm: Apply Stencil

For each pixel location in the input image A (referred to as the input pixel)

Initialize a temporary variable to zero

For each element of the Stencil object

Get an offset/value pair from the {\sl Stencil}

Multiply the stencil value with the image pixel obtained by adding the offset to the input pixel location and add the result to the temporary Assign the temporary to the output image B (at the same location as the input pixel)

With these abstractions, it is possible to create communication objects that accomplish all the communication associated with the application of a filter to an image in a parallel environment. One function of this object would be to take a processor configuration, along with the distributed image, and a given filter (with an associated stencil/neighborhood), and create a list of all sends and receives that must take place to permit local application of the filter. This would allow all interprocessor boundary exchanges associated with the application of a filter to be portable across processor configurations and data distributions. Applicants next describe how this can be done in practice.

Figure 4:
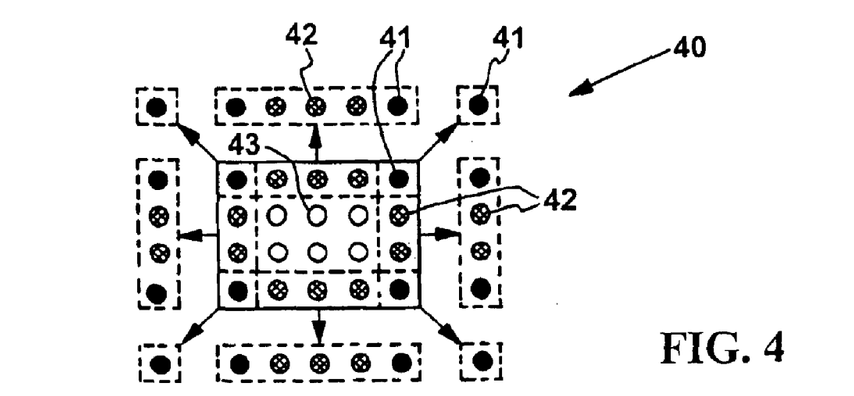
FIG. 4 depicts 8 send communication boxes used in an embodiment of the present invention.

Each processor that owns a sub-image (that is part of a larger distributed image) can determine the regions of its sub-image that must be sent to another processor as follows:

Algorithm: Identify Send Regions
For all other processors which contain boxes of the distributed image
Grow each processor's local box by the bounding box for the stencil/neighborhood to get a destination box with local plus "ghost" indices
Intersect this destination box with the current processor's local box to obtain an intersection box with indices which need communicating
Put the non-empty intersection boxes and corresponding processor ID on a list for communication In the algorithm, the ghost indices refer to the additional indices that result from the growth of each processors bounding box. In a similar way, each processor can determine the regions of other sub-images that it must receive as follows:

Algorithm: Identify Receive Regions
Grow the current processor's box by the bounding box for the stencil/neighborhood to get a source box with local plus "ghost" indices
For all other processors which contain boxes of the distributed image
Intersect the source box with the given processor's local box to obtain an intersection box with indices which need communicating
Put the non-empty intersection boxes and corresponding processor IDs on a list for communication As an example, given the previously mentioned 3×3 neighborhood and a local 4×5 box, the send communication boxes are depicted as the 8 detached boxes in FIG. 4. In FIG. 4 the neighborhood is designated by the reference numeral 40. The black circles "●" designated by the reference numerals 41, along with the gray circles 42, represents the specific collection of pixels 43 that need communicating.

Figure 5:
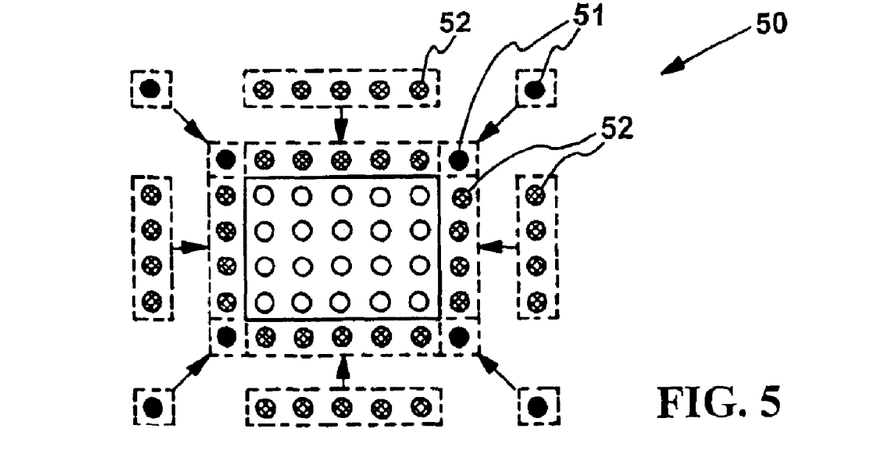
FIG. 5 depicts 8 receive communication boxes used in an embodiment of the present invention.

The receive communication boxes are depicted as the 8 detached boxes in FIG. 5. In FIG. 5 the neighborhood is designated by the reference numeral 50. The black circles "●" designated by the reference numerals 51, along with the gray circles 52, represents the specific collection of pixels 53 that need communicating.

This stencil and box idea can be used to implement the wavelet classes used in the denoising of image data. Since a wavelet can be considered as a filter bank of high and low pass filters, a new wavelet category can be added by simply creating the filters as stencils and defining the wavelet coefficients appropriately.

In order to drive the image processing application, Applicants let the user specify the distribution of the files to the processors as well as the processor topology. For example, the following input file:

| Name of File | Processors Used | Proc-Grid-Dimension | Proc-Topology |
| --- | --- | --- | --- |
| file 1 | 0 1 2 3 | 1D | Linear |
| file 2 | 4 5 6 7 | 2D | Linear-X, Periodic-Y | indicates that the two input files, file 1 and file 2 are to be assigned to the group of processors {0, 1, 2, 3} and {4, 5, 6} respectively. The four processors that operate on file1 are "connected" as a one-dimensional linear grid. The four processors that operate on file 2 are connected as a two-dimensional grid, which is linear in the X-direction, but periodic in Y.

The preceding discussion applies to inter-processor boundaries and not the actual physical image boundaries. However, different boundary treatment methodologies can be incorporated into Applicants parallel implementation paradigm. If a boundary treatment calls for mapping existing data into the boundary in some fashion (such as with periodic or reflecting boundaries), the corresponding mapped box and actual physical processor can be computed and handled in the intersection phase of the process. In the case where boundary treatment calls for numerical extension into the boundary (such as with extrapolation from the physical boundary), the actual extension can be handled separately from the above process. Finally, in the case where no boundary exchanges are incorporated, the above process could be modified to associate a specific stencil/neighborhood operation with an associated partition of the original image encompassing the boundary (i.e. a specific box). Applicants have implemented the following boundary conditions in Applicants wavelet classes:

Periodic

Whole point symmetry

Half point symmetry

Constant extrapolation from the boundary

Extent with zero

The implementation of the boundary conditions is re-usable in the sense that once a stencil is given, the regions of boundary communication/computation can be constructed in a fashion similar to the interprocessor communication regions above.

DENOISING IMAGE DATA USING WAVELETS—Denoising data by thresholding of the wavelet coefficients has been simultaneously proposed by several researchers during the past two decades. The method consists of applying a discrete wavelet transform to the original data, thresholding the detail wavelet coefficients, then inverse transforming the thresholded coefficients to obtain the denoised data. There are several ways of calculating and applying thresholds.

The simplest threshold is the Universal, $\sigma \sqrt{2 \log N}$, where N is the sample size, and $\sigma$ is the noise variance. Threshold selection alternatives, based on minimizing certain optimization criteria, include the minimax, and the SURE methods. Thresholds can also be based on hypothesis testing, cross-validation, and Bayesian estimation approaches. The most flexible of the threshold calculation methods, the Top method, involves selecting the threshold as a quantile of the empirical distribution of the wavelet coefficients. By experimenting with different quantile values, the user can interactively explore the best threshold for a given application.

The parallel implementation of the universal threshold is trivial, if the noise variance is known. Otherwise, it involves calculating certain measures of variability, like the standard deviation, $L_p$ norm, or median absolute deviation (MAD), in parallel. Calculating top thresholds in parallel requires a parallel sorting algorithm. Implementing some of the other threshold selection procedures, e.g. the minimax, in parallel requires optimizing certain risk functions in parallel.

Threshold, or shrinkage, application functions include the hard, the soft, and the semisoft functions. The hard function involves a keep or kill strategy: coefficients whose absolute values are below a positive threshold are all "killed" (set to zero), while the others are kept unchanged. The soft function is similar to the hard, except that it either shrinks or kills: the coefficients that are kept are modified by shrinking them towards zero. The semisoft function generalizes the hard and the soft functions by using two thresholds, and includes both the hard and the soft as special cases. Applying the thresholds in parallel is trivial in most cases, as once the threshold is selected, it is applied one-coefficient at a time. Applicants note however, that certain Bayesian denoising schemes do not involve separate threshold calculation and threshold application steps; rather, they shrink each wavelet coefficient by multiplying it by a function depending on the Bayesian parameters and on the coefficient itself.

The combination of soft shrinkage with the universal threshold is referred to as VisuShrink, soft with the minimax threshold is called RiskShrink, and soft along with the SURE threshold is known as SureShrink. More recent advances, BayesShrink, advocating soft shrinkage in a certain Bayesian framework, claim to outperform SureShrink estimates in the context of denoising images.

EXPERIMENTAL RESULTS—In this section, Applicants describe some preliminary results of Applicants work in progress in the area of denoising image data in parallel. The images Applicants considered arise from the Faint Images of the Radio Sky at Twenty-cm (FIRST) survey. Radio sources exhibit a wide range of morphological types. Of particular interest are sources with a bent-double morphology, as they indicate the presence of large clusters of galaxies. Currently, FIRST scientists identify bent-doubles by manually looking through the images. The image dataset is "only" about 200 Gigabytes, moderate by today's emerging standards, but large enough to inhibit an exhaustive visual inspection by the astronomers. Applicants' goal was to automate detection of bent-doubles by using data mining techniques.

The FIRST survey was producing the radio equivalent of the Palomar Observatory Sky Survey. Using the Very Large Array (VLA) at the National Radio Astronomy Observatory (NRAO), FIRST was scheduled to cover more than 10,000 square degrees of the northern and southern galactic caps, to a flux density limit of 1.0 mJy (milli-Jansky). At present, with the data from the 1993 through 1998 observations, FIRST has covered about 6,000 square degrees, producing more than 20,000 image maps. Each image map is 1550 by 1150 pixels, large enough to benefit from parallel processing. Due to the sensors used to collect the data, there is a pronounced noise pattern that appears as "streaks" in the image. The task of denoising these images is made challenging by the fact that some of the information necessary to identify a galaxy as a bent-double, could lie on a "streak" and be removed as "noise." To ensure that wavelet denoising can indeed be applied to Applicants images without any significant loss of useful information, Applicants first experimented with the serial version of Applicants code on a small image extracted from the larger image map.

All the examples were obtained using the Haar wavelet, and three multiresolution levels in the wavelet decomposition. Applicants conducted experiments with other wavelets and denoising options to find an optimal combination for the FIRST dataset. A good technique removes the background noise effectively, but keeps the important bent-double features intact. For example, in the bent-double, the two wavy lobes of the bent-double are connected by a fainter bridge. This bridge is important as it can be used to calculate the "angle" of the galaxy to determine if it is a bent-double or not. As the bridge lies on one of the noise streaks, Applicants have to be careful in the use of denoising. This task is made more challenging by the fact that the number of radio galaxies precludes individual examination of the effects of denoising on each image.

The foregoing provides an extensive description of the design and implementation of an object-oriented parallel system for image processing. It illustrates how the object-oriented paradigm can help to abstract out the commonalties across several different operations. This enables re-use of software, not only in the implementation of the image processing operations, but also the communication tasks that must be supported for parallel implementation. It shows how ideas developed in the fields of partial differential equations and linear algebra can be exploited to make Applicants software portable across data distributions and processor configurations. It present examples that show that wavelet denoising techniques can be used effectively on smaller images, and, through the use of Applicants parallel software, on larger images and volumes of data.

Figure 6:
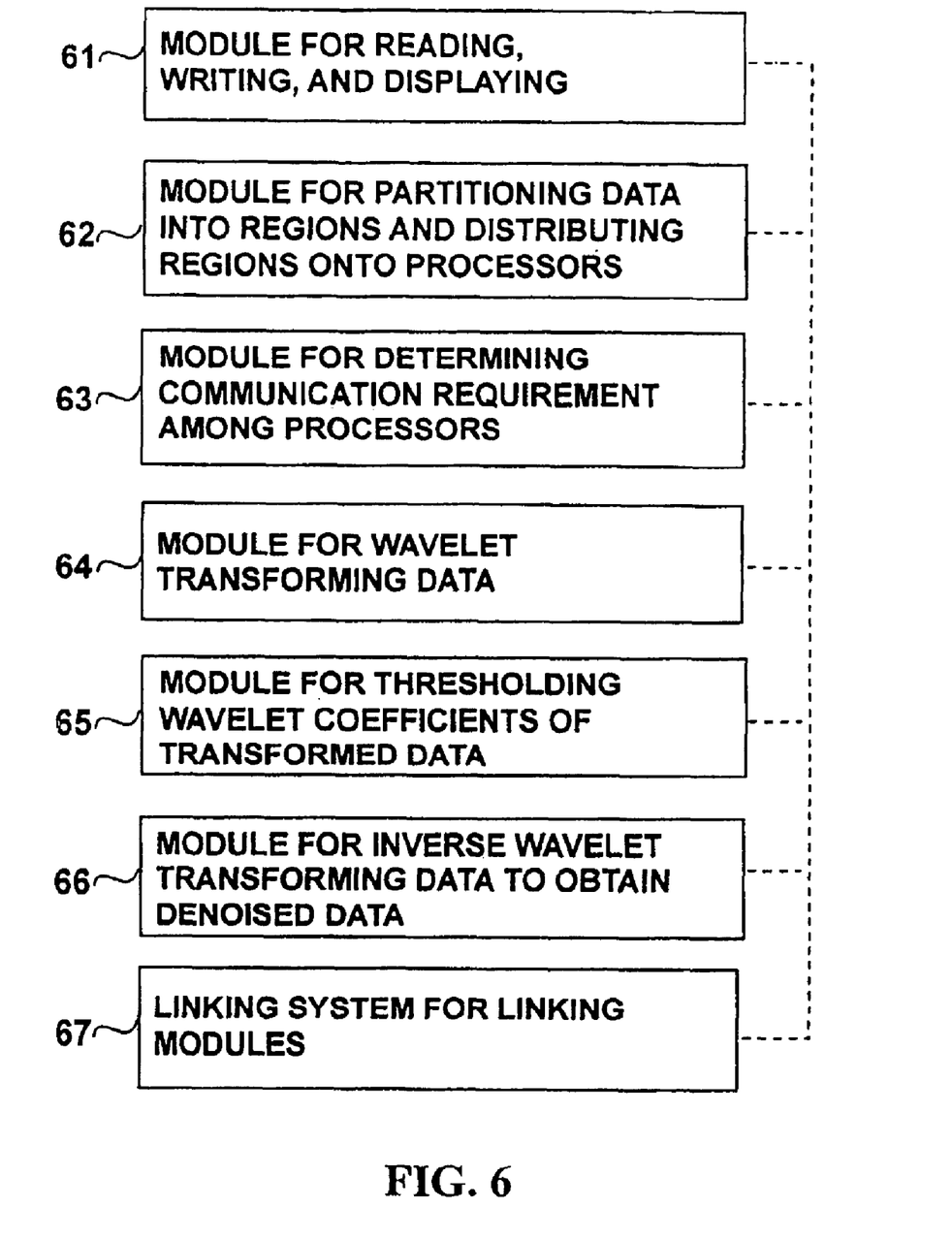
FIG. 6 is a flow chart showing the data de-noising modules of an embodiment of the present invention.

FIG. 6 is a flow chart showing the data de-noising modules of an embodiment of the present invention. The system illustrated by the flow chart includes a reading and displaying module 61 for reading and displaying the data; a partitioning and distributing module 62 for partitioning the data into regions and distributing the regions onto the processors; a communication requirements module 63 for determining communication requirements among the processors; a wavelet transforming module 64 for wavelet transforming the data; a thresholding wavelet coefficients module 65 for thresholding wavelet coefficients of the wavelet transformed data; and an inverse wavelet transforming module 66 for inverse wavelet transforming the data to obtain denoised data. A linking system 67 links the reading and displaying module, the partitioning and distributing module, the communication requirements module; the wavelet transforming module, the thresholding wavelet coefficients module, and the inverse wavelet transforming module.

The partitioning/distributing data module portion of the flowchart describes the following:

Given the input data dimension and the processor info, partition the data into contiguous rectilinear collections of regions called boxes (boxes contain only the boundary indices corresponding to the resulting regions, but not the data values in the regions).

Configure the processors according to the resulting regions.

The determining communication requirements module portion of the flowchart includes the following:

Given the processor configuration, the distributed data, and the wavelet from the denoising technique info, create a list of all sends and receives that must take place to permit local application of the wavelet filter.

Identify send regions: For each processor that owns a sub-region of the data, determine the sections of the sub-regions that must be sent to other processors as follows:

For all other processors which contain boxes of the distributed data

Grow each processor's local box by the bounding box of the wavelet filter to get a destination box with local plus ghost indices Intersect destination box with current processor's local box to obtain an intersection box with indices that need communicating Put the non-empty intersection boxes and corresponding processor IDs on a list for communication Identify receive regions: For each processor that owns a sub-region of the data, determine the sections of the sub-regions that it must receive from other processors as follows:

Grow current processor's local box by the bounding box of the wavelet filter to get a source box with local plus ghost indices For all other processors which contain boxes of the distributed image Intersect source box with the given processor's local box to obtain an intersection box with indices that need communicating Put the non-empty intersection boxes and corresponding processor IDs on a list for communication The wavelet transform module portion of the flowchart includes the following:

Given the wavelet, the boundary treatment rule, and the number of multiresolution levels, calculate the wavelet transform of the data to obtain the wavelet coefficients on the different multiresolution levels.

The wavelet thresholding-module portion of the flowchart includes the following:

Given the thresholding method (specifying how to calculate and apply thresholds and how to calculate noise estimators: globally, i.e. the same one for each multiresolution level; level-dependently, i.e. different ones for each multiresolution level; subband-dependently, i.e. different ones for each subband on each multiresolution level), the thresholding rule (specifying which rule to use to calculate the thresholds), the (optional) method to estimate the noise (required only by certain thresholding rules), and the thresholding function (specifying which function to use to apply the threshold), calculate the thresholded coefficients.

Figure 7:
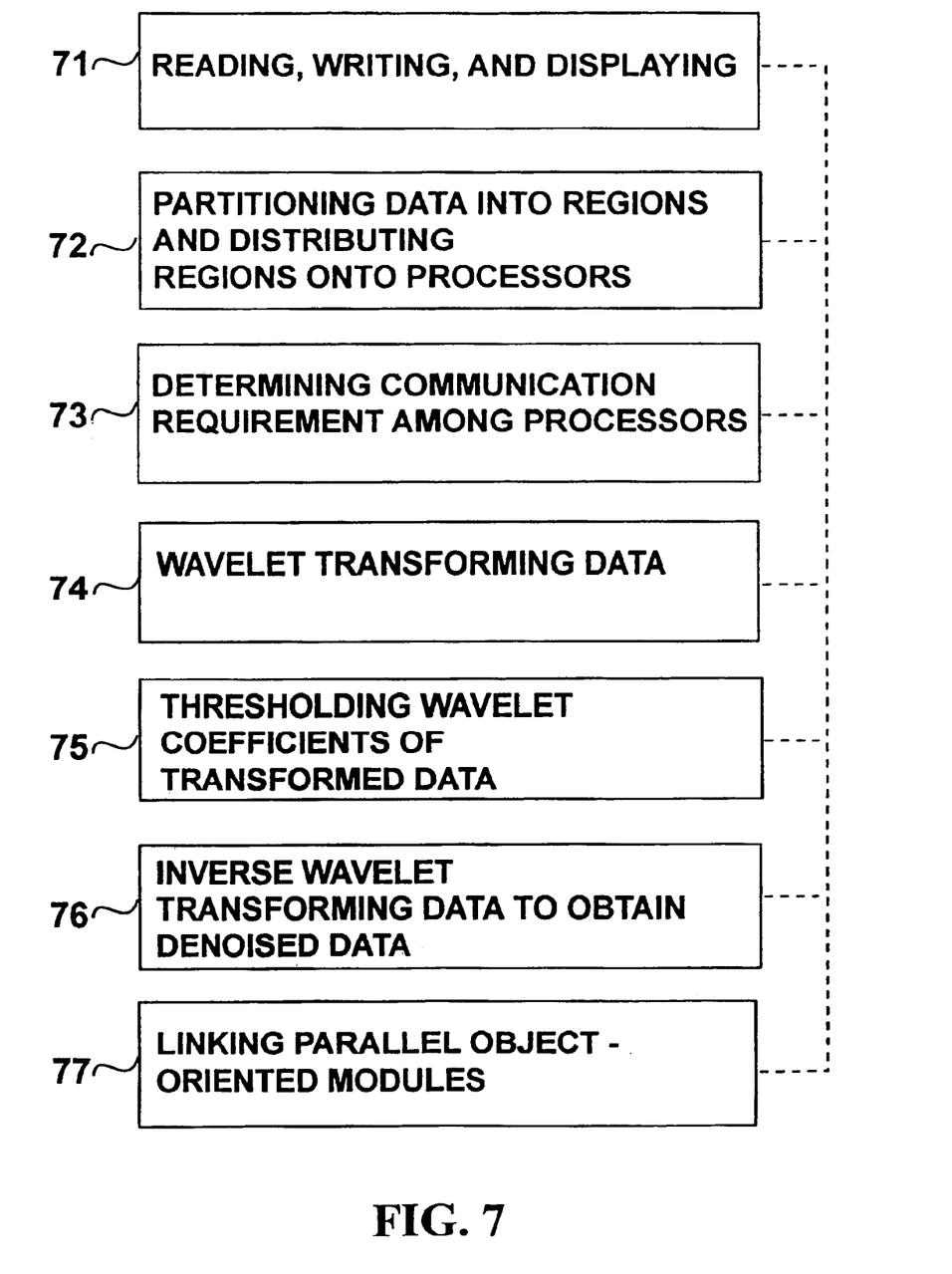
FIG. 7 is a flow chart illustrating a data de-noising method of an embodiment of the present invention.

The inverse wavelet transform wavelet module portion of the flowchart includes the following:

Given the wavelet, the boundary treatment rule, and the number of multiresolution levels, calculate the inverse wavelet transform of the thresholded wavelet coefficients on the different multiresolution levels to obtain the denoised data FIG. 7 is a flow chart illustrating a data de-noising method of an embodiment of the present invention. The method illustrated by the flow chart includes the steps reading, writing, and displaying data in different formats 71; partitioning the data into regions and distributing the regions onto the processors 72; determining communication requirements among the processors according to the wavelet denoising technique and the partitioning of the data 73; transforming the data onto different multiresolution levels with the forward wavelet transform according to the wavelet denoising technique and using the communication requirements, the transformed data containing wavelet coefficients 74; thresholding the wavelet coefficients according to the wavelet denoising technique requirements 75; transforming the thresholded wavelet coefficients using the inverse wavelet transform according to the wavelet denoising technique requirements 76; and linking the steps to transform the denoised data into its original reading, writing, and displaying data format.

The overall denoising flowchart description includes the following steps:

Read in INPUT as noisy data in original data format; processor information including number of processors and processor topologies; and denoising technique including type of wavelet, boundary treatment rule, number of multiresolution levels, thresholding rule, thresholding function, and noise estimation method desired.

Use the module for reading, writing and displaying to read in input data and transform it from its original format to the RegData format. (All the subsequent denoising work will be performed on the RegData, except the final step of writing it back to its original format.)

Use the processor info and the module for partitioning data into regions and distributing regions onto processors to distribute the RegData data onto the available processors.

Use the processor info and the denoising technique info, and the module for determining communication requirements among processors to determine the communication requirements necessary to denoise the distributed data.

Use the denoising technique info and the communication requirements, and the module for wavelet transforming data to obtain the wavelet coefficients of the distributed data.

Use the denoising technique info and the module for thresholding wavelet coefficients to obtain the thresholded wavelet coefficients.

Use the denoising technique info and the module for inverse wavelet transforming to obtain the denoised data in RegData format from the thresholded wavelet coefficients.

Use the module for reading, writing, and displaying to transform the denoised data from the RegData format into its original format.

The present invention provides a method of denoising data utilizing processors, comprising a number of steps. An object-oriented library of denoising techniques is established based on thresholding of wavelet coefficients including a suite of different wavelet filters, wavelet transforms, boundary treatment rules, threshold calculation methods, threshold application functions, and noise estimation techniques. A data distribution algorithm is used for partitioning the data into contiguous rectilinear collections of regions. The processors are configured according to the resulting partitioning. A specific wavelet denoising technique is chosen from a specified by a combination of, the wavelet filters, the boundary treatment rules, the threshold calculation methods, the threshold application methods, and the noise estimation methods from the object-oriented library of denoising techniques. The communication requirements are determined based on the partitioning, the processors, and the wavelet filters. The denoising techniques are mapped onto the processors. The data on the processors is denoised according to the denoising technique and the foregoing is agglomerated to obtain the denoised data.

The method further comprises the capability to handle any type of data format by using object-oriented design and programming by first transforming the data from its original storage medium and format into the internal RegData format. Performing all the work on the RegData. Transforming back the denoised results to the original data format and by providing simple routines to read, write, and transform each data format of interest to RegData. The method additionally comprises displaying the initial and the denoised data as an input to a visualization system. The method further comprises three main steps of: applying the wavelet transform with the specified number of multiresolution levels and the selected boundary treatment rule to decompose the data and obtain the smooth and the detail wavelet coefficients on the given number of different multiresolution levels, where the levels can be further divided into subbands in certain transforms; thresholding the detail wavelet coefficients on certain multiresolution levels; and applying the inverse wavelet transform to the thresholded wavelet coefficients to obtain the denoised data.

Additional sub-steps include specifying a threshold calculation method indicating how to calculate the threshold, a threshold application method specifying how to apply the threshold, and an optional specification of a noise estimation method indicating how to estimate the magnitude of noise for applying and calculating certain thresholds; and, in addition, also specifying whether the threshold(s) and noise estimate(s) are to be calculated and applied globally (one threshold for all the multiresolution levels) or in a level-dependent manner (calculating and applying different thresholds for the different multiresolution levels) or in a subband-dependent manner (calculating and applying different thresholds for the different multiresolution subbands).

The object-oriented wavelet denoising library includes, but it is not limited to, wavelet filters such as the haar wavelet, the daubechies family of filters, the symmlet family of filters, coiflet family of filters, the bi-orthogonal B-spline and V-spline families of filters; wavelet transforms such as redundant and non-redundant pyramidal transforms; boundary treatment rules such as periodic, reflective, symmetric, extension with zero; threshold calculation methods such as the universal, the SURE, the minimizing the false discovery rate, the top, the hypothesis testing, and the Bayes method, each with the possibility of calculating global, level-dependent, or subband-dependent thresholds; threshold application functions such as the hard, the soft, the garrote, and the semisoft, each with the possibility of applying thresholds globally, level-dependently, or subband-dependently; and noise estimation methods such as the standard deviation, the median absolute deviation, and the $L_p$ norm with p>1, using the detail coefficients from the first multiresolution level, or from any other level or combination of levels specified by the user.

The flexible object-oriented design of the wavelet denoising library allows easy plug-and-play with the different denoising options. The flexible object-oriented design of the wavelet denoising library permits the extension of the library by simply implementing and adding additional wavelet filters, wavelet transforms, boundary treatment rules, and threshold calculation, threshold application, and noise estimation methods.

The data distribution algorithm includes using the Message Passing Interface (MPI) communication library between processors on Massively Parallel Processors (MPPs) or clusters of Symmetric Multi-Processors (clusters of SMPs) to create logically rectangular processor configurations, then mapping the data onto the processor configuration in the form of boxes with minimal surface to volume ratio of the boxes, so that the cost of communication tends to be minimized and performance optimized.

The method of determining the communication requirements includes using box calculus, i.e. set operations such as grow, refine, and intersect, on the boxes that contain the locations of the boundary pixels of each of the partitioned sub-region of the original data, along with the specified wavelet filter and processor configuration, to identify for each processor the regions of the data that it needs to send/receive to/from all the other processors in order to apply the wavelet filter and the denoising to the original data in a parallel environment.

Figure 8:
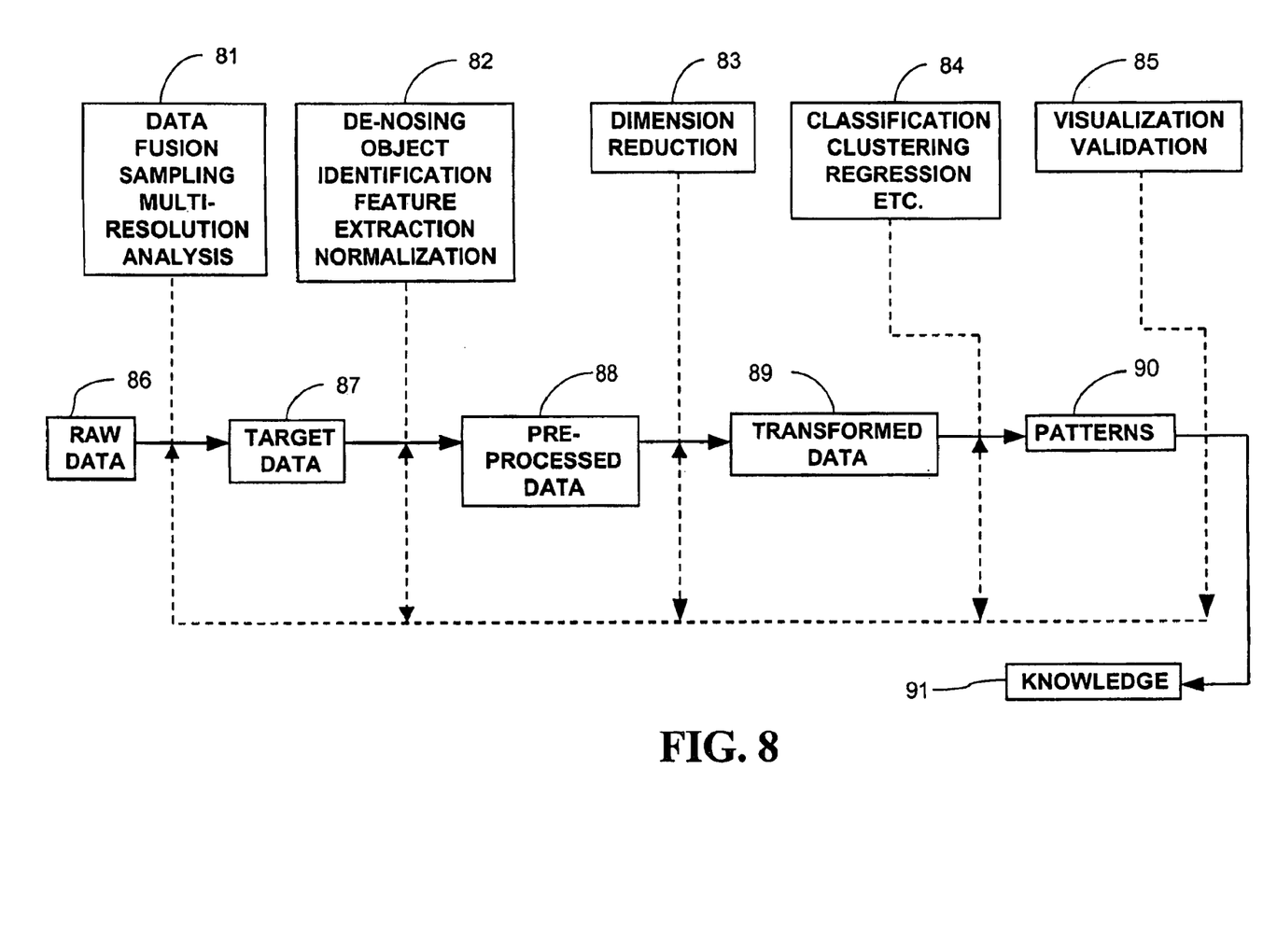
FIG. 8 is a flow chart of an embodiment of the present invention illustrating that data mining is and iterative and interactive process.

Referring now to FIG. 8, an embodiment of the present invention used in data mining is illustrated. The flow chart includes the functions Sampling, Multi-resolution analysis, Data fusion 81; De-noising, Feature-extraction, Normalization 82; Dimension-reduction 83; Classification, Clustering 84, Visualization, Validation 85, Raw Data 86; Target Data 87; Preprocessed Data 88; Transformed Data 89; Patterns 90; and Knowledge 91.

Data mining starts with the raw data and includes extensive pre-processing as illustrated in FIG. 8. If the raw data is very large, the embodiment of the present invention may use sampling and work with fewer instances, or use multi-resolution techniques and work with data at a coarser resolution. This first step may also include data fusion, if required. Next, noise is removed and relevant features are extracted from the data. At the end of this step, the embodiment of the present invention has included a feature vector for each data instance. Depending on the problem and the data, the embodiment of the present invention may need to reduce the number of features using dimension reduction techniques such as principal component analysis (PCA) or its non-linear versions. After this pre-processing, the data is ready for the detection of patterns. These patterns are then displayed to the user, who validates them appropriately.

As shown in FIG. 8, the data mining process is iterative and interactive; any step may lead to a refinement of the previous steps. User feedback plays a critical role in the success of data mining in all stages, starting from the initial description of the data, the identification of potentially relevant features and the training set (where necessary), and the validation of the results.

The development of the embodiment of the present invention required consideration of the design of the system. In order to implement the data mining process in a parallel setting as illustrated in FIG. 8, some considerable thought was given to the system's design. Applicants' experience has shown that a good design should take into account the following: (1) Not all problems require the entire data mining process, so each of the steps should be modular and capable of stand-alone operation. (2) Not all algorithms are suitable for a problem, so the software should include several algorithms for each task, and allow easy plug and play of these algorithms. (3) Each algorithm typically depends on several parameters, so the software should allow user friendly access to these parameters. (4) Intermediate data should be stored appropriately to support refinement of the data mining process. (5) The domain dependent and independent parts should be clearly identified to allow maximum re-use of software as Applicants move from one application to another.

With reference to FIGS. 1 and 8, it will be understood that the present invention provides a system of denoising data within a data mining system that includes reading, writing, and displaying engineering, business or other data in different formats, sampling said data and reducing the number of said data items, conducting multiresolution analysis to perform a reversible transformation of said data into a coarser resolution, conducting data fusion, identifying objects or data items in said data and extracting relevant features for each of said data items, conducting dimension reduction which reduces the number of features for one or more of said data items, implementing pattern recognition algorithms, using a database to store said features for each of said data items, and linking data items as necessary using a scripting language. The system of denoising data includes establishing an object-oriented library of denoising techniques based on thresholding of wavelet coefficients, including a suite of different wavelet filters, wavelet transforms, boundary treatment rules, threshold calculation methods, threshold application functions, and noise estimation steps. A data distribution algorithm is used that partitions the data into contiguous rectilinear collections of regions called boxes, and then configures the available processors according to the resulting partitioning; choosing a given wavelet denoising technique, specified by the combination of the number of multiresolution levels, wavelet filter, boundary treatment rule, threshold calculation method, threshold application method, and noise estimation method from the available object-oriented library of denoising methods; determining the communication requirements based on the data partition, processor configuration, and on the chosen wavelet filter; mapping the denoising work onto the processors; denoising the data on the processors according to the chosen denoising technique and appropriate communication requirements; and efficiently agglomerating the work to obtain the denoised data.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of denoising data utilizing parallel object-oriented processors, comprising the steps of:

establishing an object-oriented library of denoising techniques based on thresholding of wavelet coefficients including a suite of different wavelet filters, wavelet transforms, boundary treatment rules, threshold calculation methods, threshold application functions, and noise estimation techniques;

using a data distribution algorithm for partitioning said data into contiguous rectilinear collections of regions;

configuring said parallel object-oriented processors according to the resulting partitioning;

choosing a specific wavelet denoising technique specified by a combination of, said wavelet filters, said boundary treatment rules, said threshold calculation methods, said threshold application methods, and said noise estimation methods from said object-oriented library of denoising techniques;

determining the communication requirements based on said partitioning, said parallel object-oriented processors, and said wavelet filters;

mapping said denoising technique onto said parallel object-oriented processors;

denoising said data on said parallel object-oriented processors according to said denoising technique, and agglomerating the foregoing to obtain said denoised data.

2. The method of denoising data utilizing parallel object-oriented processors of claim 1 wherein said step of establishing an object-oriented library of denoising techniques comprises establishing a library from wavelet filters, or the daubechies family of filters, or the symmlet family of filters, or the coiflet family of filters, or the bi-orthogonal B-spline and V-spline families of filters, or wavelet transforms, or boundary treatment rules, or threshold calculation methods, or threshold application functions, or noise estimation methods.

3. The method of denoising data utilizing parallel object-oriented processors of claim 1 wherein said data distribution algorithm includes using a message passing interface communication library.

4. The method of denoising data utilizing parallel object-oriented processors of claim 1 wherein said step of determining the communication requirements includes using box calculus.

* * * * *